Figure 1:
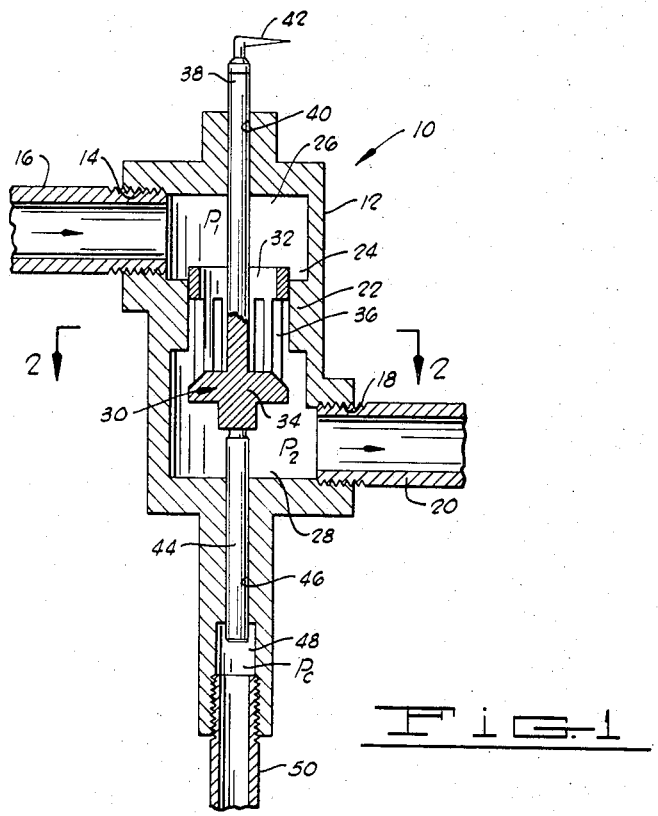

Dec. 12, 1967

C. L. ENGLISH 3,357,244

FLOW INDICATOR

Filed Nov. 12, 1964

INVENTOR.
CHARLES L. ENGLISH

BY
Dunlap & Laney
ATTORNEYS

United States Patent Office 3,357,244
Patented Dec. 12, 1967

3,357,244
FLOW INDICATOR
Charles L. English, 2204 E. 25th Place, Tulsa, Okla. 74114; Marcia K. English, executor of said Charles L. English, deceased
Filed Nov. 12, 1964, Ser. No. 410,581
4 Claims. (Cl. 73—208)

This invention relates generally to improved apparatus for indicating the flow of fluid through a hydraulic circuit or the like. More particularly, but not by way of limitation, this invention relates to an improved variable orifice flow indicator.

The invention disclosed herein is an improvement over the invention disclosed in the United States Patent No. 3,112,646 issued on Dec. 3, 1963, for Variable Orifice Flow Indicator. It has been found that the indicator described therein, while being generally satisfactory, may under some circumstances vary under the influence of a change in downstream pressure even though a change in the volume flowing therethrough does not occur. For example, a sudden pressure increase downstream may result in a slight variation in the pressure drop across the variable orifice member and, while the same volume rate of fluid flows therethrough, results in the indication of a slightly different rate of flow.

Various types of flow metering devices of the variable orifice type have been constructed in the past, but none have been entirely satisfactory. Generally, two basic problems have been encountered in the construction of such devices. For example, many of the previously constructed flow indicators have incorporated a spring for biasing the variable orifice toward a closed position, thereby counteracting the flow of fluid therethrough. The use of a spring in flow indicators has not been satisfactory due to the change in the spring rate as the spring is either compressed or extended. The change in spring rate results in the variation of the pressure drop in fluid flowing through the orifice and therefore provides an erroneous indication of the volume of fluid flowing therethrough.

The second problem encountered has involved the shape of the orifice through which the fluid will flow. Many of the previously constructed variable orifice fluid metering or indicating devices have incorporated tapered flow orifices. The use of tapered orifices results in a non-linear indication of the volume of fluid flowing therethrough.

For many years there has been a need for a fluid meter or indicator of simple and rugged construction in various industries to indicate or record changes in the rate of flow in a fluid circuit. For example, in the oil industry much valuable information can be obtained about the condition of a well and the condition of a subsurface pump mounted below the surface of fluid in the well by analyzing the record of power fluid delivered from a surface mounted hydraulic pump to the subsurface pump.

For example, a record made of the volume of power fluid flowing during the operation of the pump shows that the rate of power fluid accepted by the subsurface pump will be different during the upward or power stroke of the pump than is utilized during the downward or return stroke. Also, a precise time of shifting of the control valves in the pump is indicated because the subsurface pump will accept little or no fluid during the instantaneous period of shifting of the valves.

In addition to the time of shifting of the valves and the quantity of fluid being accepted by the subsurface pump, a record of the fluid flow to the subsurface pump also provides information regarding the length of time required by the pump to make the power stroke and the return stroke. If the length of time required to make the power stroke of the pump should change considerably, there is an indication that the production tubing leading from the subsurface pump to the surface of the well may be partially restricted or plugged by deposits, such as by paraffin, therein. If the power stroke should require considerably less time than normal it may indicate that the well is producing gas. The gas often mixes with the oil and thereby reduces the load on the subsurface pump during the power stroke so that the power stroke can be accomplished more quickly.

Subsurface pumps are normally supplied with a power fluid which will be in the pressure range of two to four thousand p.s.i. It is therefore highly desirable, not only to have a fluid metering device that will operate under such pressures, but also one that will respond accurately and quickly to minute changes in the volume of fluid flowing therethrough even when relatively high pressures are imposed on the metering device.

Broadly, this invention contemplates an improved variable orifice flow indicator including a body having a flow passageway therethrough, an orifice member disposed in the flow passageway to create a pressure drop in fluid flowing through the indicator, means for varying the flow area of the orifice member, and means for applying a constant force to the means for varying the orifices tending to counteract the flow of fluid through the body and to bias the orifice toward a closed position whereby a constant pressure drop in the fluid flowing therethrough will be maintained, and means for indicating the position of the means varying the flow area of the orifices to indicate the volume rate of fluid flowing through the indicator.

One object of the invention is to provide an improved fluid flow indicator that accurately indicates the volume rate of fluid flowing therethrough.

Another object of the invention is to provide an improved fluid flow indicator that maintains a constant pressure drop in fluid flowing therethrough.

Still another object of the invention is to provide an improved fluid flow indicator that responds linearly to changes in the rate of fluid flow therethrough.

A further object of the invention is to provide an improved fluid flow indicator that is not sensitive to pressure changes in the fluid flowing therethrough.

One other object of the invention is to provide an improved fluid flow indicator that is responsive only to changes in the rate of fluid flow therethrough.

A still further object of the invention is to provide an improved fluid flow indicator that requires little or no maintenance during its service life.

Figure 2:
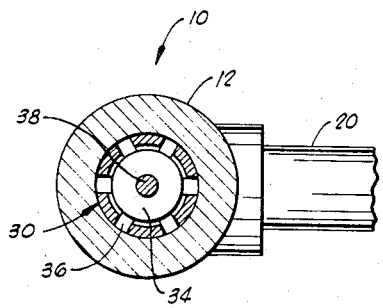

The foregoing and additional objects and advantages of the invention will become more apparent as the following detailed description is read in conjunction with the accompanying drawing wherein like reference characters denote like parts in all views and wherein:

FIG. 1 is a vertical cross-sectional view of a fluid flow indicator constructed in accordance with the invention; and FIG. 2 is a cross-sectional view of the fluid flow indicator of FIG. 1, taken along the line 2—2 of FIG. 1.

Referring to the drawing and to FIGS. 1 and 2 in particular, shown therein and generally designated by the reference character 10 is a fluid flow indicator constructed in accordance with the invention. As shown therein, the fluid flow indicator 10 includes a hollow body 12 having a threaded inlet 14 connected with a fluid conduit 16, and a threaded outlet 18 connected with a threaded conduit 20.

An inwardly extending annular flange 22 extends into a chamber 24 in the interior of the body 12, dividing the chamber 24 into an inlet end 26 and an outlet end 28. An orifice member 30 is reciprocally mounted in the chamber 24 and is sized to fit closely within the annular flange 22. The orifice member 30 has an open upper end 32, a closed lower end 34, and a plurality of flow orifices 36 extending through the medial portion thereof. (See FIG. 2.)

As can be seen most clearly in FIG. 1, the orifices 36 are illustrated as being elongated slits of rectangular cross-section and are disposed in the orifice member 30 in juxtaposition with the annular flange 22 in all but the lowermost operating position of the orifice member 30. The orifices 36 are preferably rectangular in cross-section so that the flow area therethrough will vary linearly as the orifice member 30 is moved in the chamber 24 adjacent the flange 22.

As illustrated in FIG. 1, a rod member 38 extends upwardly from the valve member 30 through the inlet end 26 of the chamber 24 and through an opening 40 in the body 12. The rod member 38 may be sized to fit closely within the opening 40, or, if desired, may be encircled by conventional packing means (not shown). The arrangement is such that fluid is prevented from escaping the chamber 24 between the rod member 38 and the body 12. The upper end of the rod member 38, outside the body 12, may be provided with a stylus 42 as illustrated for recording its position on a conventional recording device (not shown) or, if desired, may be provided with means to actuate an indicating means, such as a dial indicator (not shown).

A second rod member 44 extends from the lower end 28 of the chamber 24 through an opening 46 in the body 12 and into an enlarged, partially threaded passageway 48. The rod member 44 is preferably of the same diameter as the rod member 38 for purposes which will become more apparent hereinafter.

A conduit 50 has one end threadedly connected with the passageway 48 and the other end connected with a source of fluid (not shown) under constant pressure, $P_c$, so that the lower end of the rod member 44 is continually exposed to the pressure $P_c$. With the constant pressure $P_c$ exerted on the rod member 44, it can be appreciated that a constant force will result, urging the rod member 44 toward the inlet end of the chamber 24.

Fluid pressure in conduit 16 and in the inlet end 26 of the chamber 24 has been designated as $P_1$ and fluid pressure in the outlet end 28 of the chamber 24 and in the outlet conduit 20 has been designated as $P_2$. It should be pointed out in connection with the structure of the indicator 10, that the rod member 44 can be connected with the lower end 34 of the orifice member 30 if it is anticipated that the pressure $P_2$ will be greater at any time than the pressure $P_c$. However, because of the alignment difficulties in manufacturing the indicator 10, it is preferred that the rod member 44 be separate from the orifice member 30. For the same reasons, the rod member 38 may also be constructed separately from the orifice member 30, but it must be attached to and movable with the orifice member 30.

Operation

As fluid flows through the indicator 10 from the inlet conduit 16, through the chamber 24 and orifice member 30, and through the outlet conduit 20, it can be seen that the pressure $P_1$ is greater than the pressure $P_2$. The difference in the pressures $P_1$ and $P_2$ is referred to hereinafter as the pressure drop. The pressure drop is caused by the restriction to fluid flow afforded by the orifices 36.

In general terms, the volume of fluid flowing through an orifice is equal to the square root of the pressure drop across the orifice multiplied by an orifice factor and by the flow area of the orifice. If the orifice factor and the pressure drop are constant, it follows that the area of the orifice varies as the volume flowing therethrough varies.

The orifice factor is constant in the indicator 10, described in detail hereinbefore, because of the rectangular cross-section of the orifices 36. The cross-sectional configuration of the orifices 36 is maintained even though the effective flow area therethrough is changed by moving the orifice member 30 relative to the flange 22.

The constant value of the pressure drop $(P_1-P_2)$ across the indicator 10 is shown by mathematically analyzing the forces acting on the orifice member 30. The force acting downwardly thereon is equal to the pressure $P_1$ times the cross-sectional area of the orifice member 30 minus the area of the rod member 38, plus the pressure $P_2$ times the area of the rod member 44.

An upwardly directed force on the orifice member 30 and the rod member 44 is equal to the pressure $P_2$ times the cross-sectional area of the orifice member 30 plus the constant pressure $P_c$ times the cross-sectional area of the rod member 44. Solving the aforestated mathematical relationship, it can be seen that the pressure drop, i.e., $P_1$ minus $P_2$ is equal to a constant.

Since $P_1$ minus $P_2$ is always a constant value, the orifice member 30 will position itself in the chamber 24 so that the cross-sectional area or flow area of the orifices 36, in conjunction with the annular flange 22, will maintain a constant, preselected difference relationship between the pressures $P_1$ and $P_2$. For example, if the pressure $P_1$ is equal to 2,000 pounds and the orifices 36 are designed to produce a 20 p.s.i. pressure drop in fluid flowing therethrough, the outlet pressure $P_2$ will be equal to 1,980 p.s.i. If the pressure $P_1$ increases to 4,000 p.s.i., with no change in the volume of fluid flowing, $P_2$ will be 3,980 p.s.i.

If the volume of fluid flowing through the indicator 10 increases, the orifice member 30 moves toward the outlet end 28 of the chamber 24 increasing the effective flow area of the orifices 36 to maintain the pressure drop constant as shown by the mathematical equation of effective forces acting on the orifice member 30. Similarly, a decrease in the volume of fluid flowing through the indicator 10 results in the movement of the orifice member 30 toward the inlet end 26 of the chamber 24 to decrease effective flow area of the orifices 36 to maintain the constant pressure drop.

From the foregoing, it can be seen that solving the general relationship stated for flow through an orifice, with the constant values established by the indicator 10 and the resultant forces acting thereon, leads to the conclusion that the effective flow area of the orifices 36 will be varied as the flow rate changes. Thus, it can be appreciated that the orifice member 30 and the stylus 42 are positioned in accordance with the volume rate of fluid flowing through the indicator 10.

As an example of the operation of the indicator 10, assume that the conduit 16 is connected with a source of fluid (not shown) under pressure $P_1$ and that the outlet conduit 20 is connected with a hydraulic motor driving a subsurface pump (not shown). With the subsurface pump operating at normal conditions, the fluid motor driving the pump will accept a particular volume of fluid at some pressure $P_2$ and accordingly, the orifice member 30 and the stylus 42 will move to maintain a predetermined pressure drop $(P_1-P_2)$ therethrough.

Upon reaching the end of the power stroke, a valve (not shown) in the hydraulic motor shifts to reverse the direction of movement of the motor and pump. During the instantaneous period while the valve shifts, the hydraulic motor will accept no fluid. When there is no fluid flowing, the pressure $P_c$ will drive the rod member 44 upwardly carrying the orifice member 30 upwardly therewith and closing the orifices 36 as they move into juxtaposition with the annular flange 22. Since the valve shift takes only a very short time, fluid will again begin flowing through the indicator 10 as the motor and pump start their return stroke. Accordingly, the orifice member 30 and stylus 42 will move downwardly until the predetermined pressure drop through the orifices 36 is again attained. If the hydraulic motor accepts precisely the same volume of fluid on the return stroke as on the power stroke, the stylus 42 will be located in precisely the same position as during the power stroke.

If the hydraulic motor will not accept as much fluid during the return stroke of the pump, even at the same or increased pressure $P_2$, the rod 44 will be driven upwardly by the constant pressure $P_c$, moving the orifice member 30 upwardly in the housing 12 until the pressure drop, $P_1-P_2$, again reaches the preselected value. As the orifice member 30 moves upwardly, the stylus 42 will also move upwardly to indicate that less fluid is flowing through the indicator 10.

When the end of the return stroke is reached, the valve will again shift and the hydraulic motor will not accept fluid for an instantaneous period as previously described. During this period of no flow, the orifice member 30 will move upwardly closing the orifices 36 and carrying the stylus 42 upwardly to indicate that fluid flow has stopped.

If, on the ensuing power stroke, a partial plugging occurs in the well above the subsurface pump so that the load on the pump and motor is increased, the pressure in the hydraulic circuit may be increased to provide additional power to the hydraulic motor. If the hydraulic motor will accept the same volume of fluid at the increased pressure as on a normal power stroke, the volume of fluid flowing through the indicator 10 will be the same as on a normal stroke and the orifice member 30 and stylus 42 will be positioned in accordance with the volume flowing even though the pressures $P_1$ and $P_2$ are substantially increased.

Similarly, if the fluid in the well should become gas cut and, therefore, exert less load on the motor during the power stroke because of the reduced density of the mixture, the orifice member 30 and stylus 42 will be positioned as on a normal power stroke, if the hydraulic motor will not accept additional fluid even though less pressure is required to supply the same volume of fluid. Manifestly, if the hydraulic motor will accept more fluid, the orifice 30 will move downwardly in the body 12 carrying the stylus 42 downwardly, thereby indicating an increase in fluid flowing through the flow indicator 10.

It should be pointed out that a flow indicator, constructed in accordance with the invention, can be utilized in a fluid circuit in any desired operating position. The indicator can be arranged as desired because of the use of a constant pressure to positively bias the orifice member 30 toward a position closing the orifices.

Furthermore, the indicator is extremely simple and rugged thereby reducing the manufacturing and maintenance costs. The rugged structure also permits the indicator to be used in rather severe service conditions.

The provision of the orifices 36 having a rectangular cross-section not only affords a constant orifice coefficient, but also results in a linear indication of flow through the indicator since the effective flow area of the orifices 36 varies linearly as the orifice member moves in the chamber 24.

It should be understood that the embodiment disclosed herein is presented by way of example, and that many changes and modifications can be made thereto without departing from the spirit of the invention and from the scope of the annexed claims.

What is claimed is:

1. Apparatus for indicating fluid flow through a conduit, comprising:
   a body having a chamber formed therein with a first end and a second end, an inlet connected with the conduit and in communication with the first end of said chamber, and an outlet connected with the conduit and in communication with the second end of said chamber;
   an orifice member movably disposed in said chamber to cause a pressure drop in fluid flowing from the first to the second end of said chamber, said orifice member having at least one rectangular flow orifice therein;
   a first rod member connected with said orifice member and extending through said body adjacent the first end of said chamber to indicate the position of said orifice member;
   a source of constant pressure fluid connected with said body; and,
   a second rod member having a cross-sectional area equal to the cross-sectional area of said first rod member and having a first end in engagement with said orifice member and a second end exposed to said source of constant pressure fluid, whereby a constant force is exerted on said second rod member urging said orifice member toward the first end of said chamber to maintain a constant pressure drop in the fluid flowing through said chamber.

2. Apparatus for indicating fluid flow through a conduit, comprising:
   a body having a chamber formed therein with a first end and a second end, an inlet connected with the conduit and in communication with the first end of said chamber, and an outlet connected with the conduit and in communication with the second end of said chamber;
   an orifice member movably disposed in said chamber to cause a pressure drop in fluid flowing from the first to the second end of said chamber, said orifice member including a flow orifice adapted to be opened and closed upon movement of said orifice member;
   a rod-member connected with said orifice member and extending through said body adjacent the first end of said chamber to indicate the position of said orifice member; and
   means for exerting a constant force on said orifice member urging said orifice member toward the first end of said chamber to maintain a constant pressure drop in the fluid flowing through said chamber, said means compising:
   a source of constant pressure fluid connected with said body; and,
   a second rod member movably mounted in said body adjacent the second end of said chamber and having a first end in engagement with said orifice member and a second end exposed to said source of constant pressure fluid.

3. The apparatus of claim 2 wherein said second rod member has a cross-sectional area equal to the cross-sectional area of the rod member extending through said body.

4. Apparatus for indicating fluid flow through a conduit, comprising:
   a body having a chamber formed therein with a first end and a second end, an inlet connected with the conduit and in communication with the first end of said chamber, and an outlet connected with the conduit and in communication with the second end of said chamber;
   an orifice member movably disposed in said chamber to cause a pressure drop in fluid flowing from the first to the second end of said chamber, said orifice member including at least one rectangular flow orifice therein adapted to be opened and closed on movement of said orifice member, whereby the flow area through said orifice varies linearly in response to movement of said orifice member;

a rod-member connected with said orifice member and extending through said body adjacent the first end of said chamber to indicate the position of said orifice member; and, means for exerting a constant force on said orifice member urging said orifice member toward the first end of said chamber to maintain a constant pressure drop in the fluid flowing through said chamber.

References Cited

UNITED STATES PATENTS

| 299,737 | 6/1884 | Chapin | 73—208 |
| 505,652 | 9/1893 | Greene | 73—208 |
| 701,382 | 6/1902 | Patten | 73—208 |
| 2,640,356 | 4/1950 | Shannon | 73—208 |

FOREIGN PATENTS

| 5,804 | 6/1879 | Germany. |

RICHARD C. QUEISSER, *Primary Examiner.*

JAMES J. GILL, *Examiner.*

E. D. GILHOOLY, *Assistant Examiner.*